Aug. 21, 1951
C. A. FORSSELL
2,565,424
METHOD AND APPARATUS FOR DETERMINING THE
CRACKING STRENGTH OF CONCRETE
Filed May 4, 1945
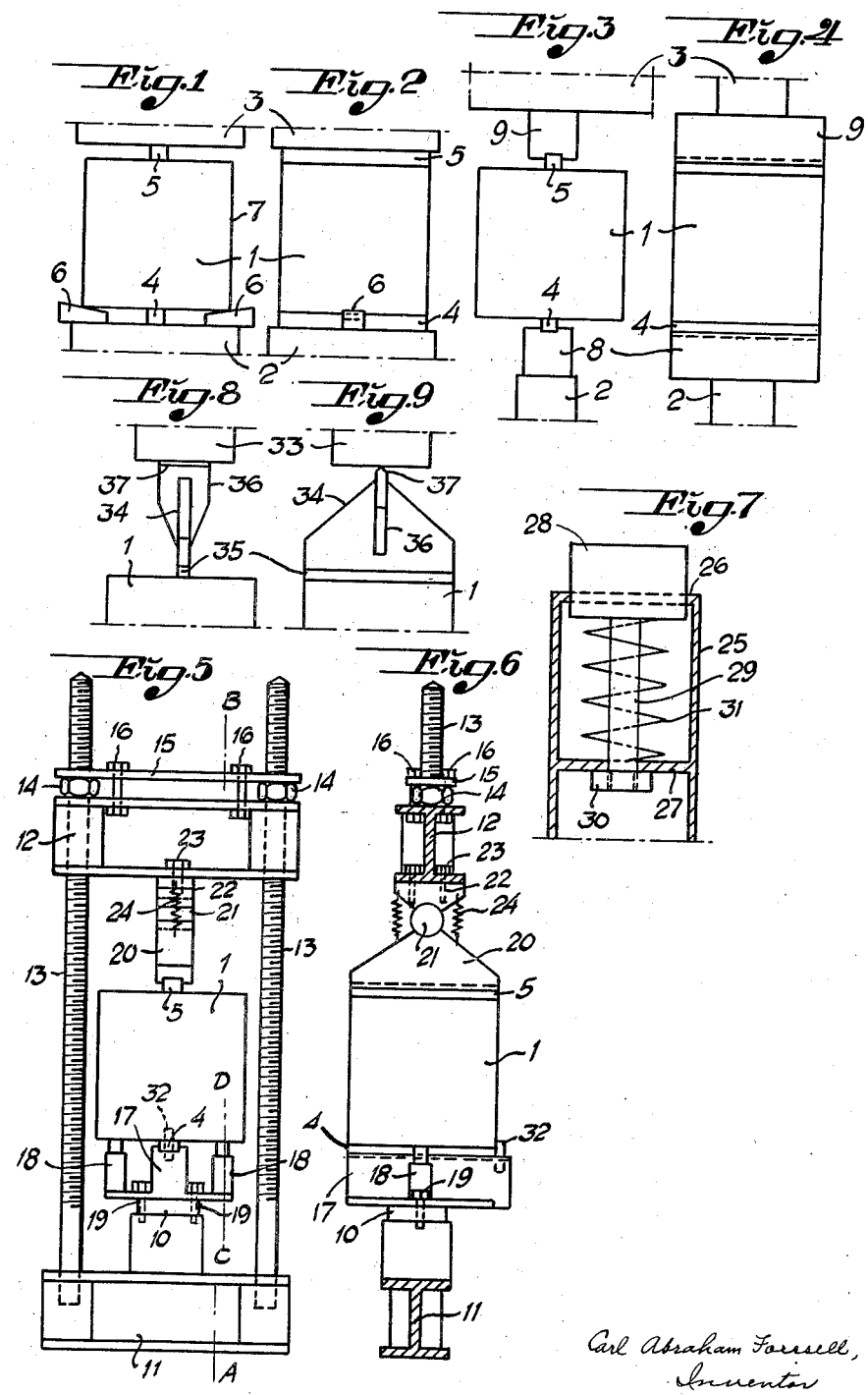

Patented Aug. 21, 1951

2,565,424

UNITED STATES PATENT OFFICE 2,565,424

METHOD AND APPARATUS FOR DETERMINING THE CRACKING STRENGTH OF CONCRETE

Carl Abraham Forssell, Stockholm, Sweden

Application May 4, 1945, Serial No. 592,036
In Sweden November 27, 1943

Section 1, Public Law 690, August 8, 1946
Patent expires November 27, 1963

8 Claims. (Cl. 73—94)

The present invention refers to a new method and means in the testing of the strength of concrete for the purpose of controlling the nature of the concrete by subjecting solid test bodies of known type, preferably cubes or prisms, to a compressive load, and the invention consists in that the test body is loaded by pressure on two opposed and opposite surfaces by two opposite forces, one or both of which act with only a partial pressure load on the surface compressively loaded by the respective force. That is, the compression force is applied to only a limited portion of the entire surface area of the test body as distinguished from the past conventional practice of applying the forces of compression over the entire surface of the test body. In the latter testing method, the compression force is increased until the test body is crushed while in my new method, the force is increased only until a rupture or crack appears along the compression axis. Thus the new method may be referred to as a "splitting" test as distinguished from the past practice of "crushing" the test body. If the test body is a cube or a prism, the pressure load is distributed toward the two opposed surfaces, preferably each on a straight "stripe" of uniform width, said stripes being mutually parallel and of the same width and situated opposite one another. They may preferably extend, wholly or partly, across the surface of the test body, but may also be arranged with their longitudinal direction parallel to the longitudinal direction of the loaded surface of the test body, if the latter is a prism, for example. The stripes may extend through the centre of the loaded surface, in which case only one pressure loading test can be made with each test piece. A plurality of test pressing operations may be performed with each test piece consecutively by disposing the stripe or the two stripes situated on opposite sides of the test piece in another position of the test piece, preferably in parallel to the preceding position. With a test piece in the form of a prism or column, it will thus be possible to test the nature of the concrete in a series of cross sections from one end to the other. With a cube, up to three tests of this kind may be performed in positions adjacent to each other. In a cube or rectangular prism, the loaded stripe is preferably parallel to one of the border lines of the loaded surface. In a test piece of circular cylindrical shape, the two compressive forces may be applied to the plane end surfaces in the manner herein set forth, but they may instead be arranged either against two narrow stripes along diametrically opposed generatrixes in the cylinder surface, or at right angles thereto. In the latter case, the two stripes may be formed according to the circular circumference of the cross section, and may, when situated diametrically opposite each other, preferably each comprise a centre angle of about 90° at each varying dimension of the test body, which may be justified for instance on account of an altered dimension of the largest stones in consideration, it being then preferred to make use of a rectilinearly enlarged or reduced test body and in the same manner rectilinearly to enlarge these loaded surfaces.

The width of the loaded stripe on the surface of a test body is therefore preferably proportional to the cross dimension of the surface, it being still possible for the sake of convenience to maintain the same width of the stripe within certain limits in connection with test bodies of different sizes.

At a partial pressure load on a surface, planing off in the ordinary manner with cement mortar or the like involves that an unnecessarily large surface will have to be planed outside the actual pressure surface.

Experience has shown that with a comparatively small width of the partially loaded portion of the surface this planing off with cement may be obviated if replaced by a porous plate inserted between the test body and the pressing member of the testing machine, said porous plate then bearing directly against the untreated surface of the test body and being shaped to its partially pressure-loaded portion. This porous plate may preferably consist of a wood fibre plate of known type (porous masonite or the like). To facilitate the pressure-equalizing effect of the porous plate, it will then be preferable as a pressure-loaded surface of the test body to select a surface which would bear against the mould in the casting of the test body, and which is therefore uniform. When the test bodies consist of cubes or square prisms, the pressure-loaded surfaces may be constituted by two opposed lateral surfaces that would be vertical in the casting process and bear against the mould. If the partially pressure-loaded portion of the surface is here constituted by a straight stripe of uniform width, it may either be parallel to the border of the surface which would be free in the casting process, or extend at right angles thereto. In the first case, the borders of the cracked surface will be accurately determined by the mould, which involves the advantage of accurately equal dimensions of the cracked surface in different cubes. If the test bodies are circular solid cylinders, the two compressive forces may be applied, according to the above, in a corresponding manner and for the same reasons to stripes in the cylindrical surface that have been enclosed by the mould.

An ordinary testing machine can be readily modified for the testing herein set forth with only partially pressure-loaded surfaces, for instance by inserting cut plates or fillets between the test body and the pressure-loaded surfaces of the machine, as per above, said plates or fillets forming the partially pressure-loaded portions of the compressive surfaces and preferably forming at the same time the above-mentioned porous intermediate insets.

The cut plates or fillets forming the two partially pressure-loaded portions of the surfaces on the two loaded sides of the test body, which in the following, upon the insertion into the testing machine, are taken to be the upper and the lower surfaces of the test body, should be placed relatively to the testing machine, also called the machine in the following, in a manner such that the centres of gravity of the surfaces coincide with or come adjacent to the static principal axis of the testing machine. (In an ordinary testing machine, wherein the force between the cross girders at the two compressive surfaces of the machine is transferred through two parallel and equally dimensioned screws as tractive members, said principal axis extends in parallel to the screws while being located midway between their centre lines.) This may preferably be effected by fixing these cut plates or fillets in the desired position relatively to the testing machine, such plates or fillets being partly countersunk and, if desired, clamped fast in grooves or incisions provided in the compressive surfaces of the testing machine, or in grooves or incisions in loose plates or girders which, in turn, are fixed in known manner in their position relatively to the compressive surfaces of the machine, for instance by means of screws or cramps. The incisions may be replaced by marks or scores in these surfaces, solely to aid in the adjustment of the partially pressure-loaded surfaces.

If in a testing machine having two screws as tractive members these two partially pressure-loaded surfaces are narrow straight stripes, the longitudinal axes of which extend in parallel to planes extending through the centre lines on the screws, a comparatively great strain of flexure will be produced in the screws by a slight erroneous placing of the centre of either one or both of the stripes relatively to the plane through the axes of the screws. Again, if the longitudinal axes of the stripes extend at right angles thereto, a corresponding eccentric placing relatively to the plane of the screws will only cause a slight alteration in the distribution of the strain along the stripe, and therefore does not cause any noticeable additional strain on the screws of the testing machine. For this reason, these narrow straight stripes should have their longitudinal axes extending at right angles to the plane of the screws in a testing machine provided with two screws.

If the partially pressure-loaded surfaces are narrow straight stripes along two opposite sides of the test body, the testing result will be influenced only very slightly by a moderate eccentricity, in the lateral direction of the stripe, of the position of the stripe relatively to the centre line of the test body. This is particularly the case in a cube or a prism of square section. If the partially pressure-loaded surfaces are centered and directed relatively to the testing machine, the fitting of the test body into the machine, which must be effected carefully, and above all, its adjustment along the stripe, whereas the centre of the test body should come near the principal axis of the testing machine.

For this adjustment in the lateral direction one may use mounting contrivances consisting, for instance, of two rigid pins or springs which are elastic in the horizontal direction, between which the test body is centered in a direction along the stripe with a small play, or, it will be possible to provide only a single pin or spring adjacent to the proper position on the edge of the test body, at which the stripe has the one end thereof. These pins or springs may preferably be secured to the lower compressive surface of the testing machine or to a loose plate or girder, which is secured in turn to this compressive surface. This plate or girder may be the same in which, according to the above, an incision is cut to fix the position of the partially pressure-loaded surface relatively to the testing machine.

Since the partially pressure-loaded surface on the lower side of the test body is a narrow straight stripe, the test body is apt to tilt sideways when it is first inserted in its place, before the compressive load has been applied. This may be prevented by loose intermediate members, such as wedges, inserted between the test body and the lower compressive surface of the machine, which intermediate members are preferably removed after the test body and the intermediate member for the partially pressure-loaded surface have been mounted on the upper side thereof and a first slight pressure has been produced, which is sufficient to fix the test body in its proper position. This adjustment may be facilitated by special mounting contrivances, which may preferably consist of two or more supports elastically compressible in the vertical direction, the upper surfaces of which supports are adapted in the unloaded state to come about on a level with the upper surface of the intermediate member forming the lower partially pressure-loaded surface of the test body. In this position of their upper surface, said elastic supports preferably have an elastic internal initial tension approximately equal to the load exerted on them by the own weight of the test body, and have their elastic elongation confined to this position. At a maximum movement in these elastic supports on account of the compressive load of the test body in the machine, the increase of the compressive load of the elastic supports should be small compared with their initial tension. If the partially pressure-loaded surface is a straight narrow stripe, there are preferably two of these elastic mounting contrivances placed at right angles to the stripe, one inside each edge of the test body mounted in the machine. The elastic contrivances may be mounted directly on the lower pressure-loaded surface of the testing machine or on a loose plate or girder in the same manner as the mounting contrivances for the adjustment of the test body in a lateral direction.

Since according to the above the test body has in its proper position been placed on the lower pressure-loaded surface of the testing machine, while the upper partial pressing surface consisting of a straight and narrow stripe is inserted in the proper position relatively to the upper pressure-loaded surface of the testing machine, there will be some warping to a certain extent between the two surfaces when the upper pressure-loaded surface is moved in the ordinary manner down toward the upper surface of the test body. This warping is readily equalized in the transverse direction of the narrow stripe by the compression of a porous intermediate layer as per above. Along the stripe, greater movements are called upon in proportion to the length at the extreme ends of the stripe to equalize the wryness. This may cause difficulties. These difficulties may be obviated by the introduction of a joint between that plate or girder, against which the upper partially pressure-loaded surface preferably bears, and the pressure-loaded surface of the testing machine. This joint may consist of a horizontal shaft which is directed at right angles to the longitudinal direction of the stripe, and which is preferably turned down at the bottom in the above-mentioned plate or girder, and turned down on the upper side thereof in a covering plate or girder which, in turn, bears on the upper pressure-loaded surface of the machine, and may preferably be secured to the latter in known manner. If desired, it is possible in place of the shaft to make use of a ball in this bearing. Between the two plates or girders on both sides of the shaft or the ball, there may preferably be provided resilient bonds of known type, by means of which the bearing is suspended at the upper pressure-loaded surface of the testing machine, said bond offering a certain resistance to an unimpeded angular movement of the bearing, whereas it does not appreciably counteract the automatic adjustment thereof, when the forces commence to act in the testing machine.

Instead of by means of such a bearing, a corresponding centering of the upper side of the test body may be gained with the aid of a bearing with two axes, said bearing consisting of two plates joined together in known manner at right angles in the form of a cross. One of these plates bears with the lower edge thereof on the upper partially pressure-loaded surface of the test body or on the porous fillet covering said surface, and the other plate bears with its upper, preferably cylindrically rounded surface on the upper pressure-loaded surface of the testing machine. By turning this bearing with two axes about the bearing line at the lower edge of the first plate, the upper edge of the second plate may be caused to bear along the whole of its length against the pressure-loaded surface of the testing machine, which in ordinary cases only calls for a small turning movement about the lower edge of the bearing with two axes.

In the accompanying drawing, Figs. 1, 2 and 3, 4 respectively are elevations of an arrangement according to the invention in projections at right angles to each other. Fig. 5 is an elevation and Fig. 6 a vertical section on line A—B of an arrangement according to the invention. Fig. 7 shows a detail in section to an enlarged scale on line C—D in Fig. 5. Figs. 8 and 9 are elevations of a detail arranged in accordance with the invention.

In Figs. 1–6 and 8–9, 1 designates a concrete cube to be tested. In Figs. 1–4, 2 denotes the lower and 3 the upper pressing members of the testing machine. 4 and 5 are narrow straight fillets forming the partially pressure-loaded surfaces, said fillets being represented here as extending transversely over the respective surfaces of the test body. They may preferably consist of porous material, which renders the planing of the surface of the test body unnecessary.

In Figs. 1 and 2, 6 designates loose wedges used to support the test body, until the pressure on the latter holds the same sufficiently, the wedges being then preferably removed, if they do not consist of porous material while the fillets 4 and 5 consist of a hard material, in which case the wedges 6 might be left in their places during the pressing of the test body. 7 indicates the rough surface of the cube turned upwardly during the casting of the cube, said surface paralleling a plane extending through the fillets 4 and 5.

In Figs. 3 and 4, 8 and 9 are girders constituting intermediate members between the lower pressure-loaded surface of the machine at 2 and the fillet 4 and between its upper pressure-loaded surface at 3 and the fillet 5, respectively. The fillets 4 and 5 are located in grooves in the surface of the girders 8 and 9 respectively, which are taken to be fixed in their positions relatively to the parts 2 and 3 of the machine in known manner, not indicated in the drawing.

In Figs. 5 and 6, 10 designates the pressing member of the machine, the same being represented as a jack, the upper surface of which constitutes the lower pressure-loaded surface of the machine. The pressing member 10 rests on the lower cross girder 11 of the machine. 12 is the upper cross girder of the machine, the lower surface of this girder forming the upper pressure-loaded surface of the machine. 13 are two screws acting as pulling members to keep the cross girders 11 and 12 together, said screws being threaded into the girder 11 and bearing with the nuts 14 against the girder 12. The invisible parts of the screws are not represented in Fig. 6. 15 is a plate secured by means of the bolts 16 to the girder 12 and compelling the latter to follow the movements of the nuts 14 even at an upward movement of the nuts. The nuts 14 are adapted accurately to follow one another when turned, which may be effected in known manner by means of gearings not represented in Figs. 5 and 6. 17 is a ⊥-shaped girder with a groove in its upper surface for the fillet 4, the longitudinal direction of which extends at right angles to the plane through the axes of the two screws 13. The girder 17 bears with its lower side on the lower pressure-loaded surface of the machine forming the upper side of the pressing member 10, with which it is connected by means of the bolts 19. 18 are two elastic supports secured to the girder 17, the upper surfaces of said supports being on a level with the upper surface of the fillet 4, before the same have been loaded. 32 is a pin secured to the upper surface of the girder 17 in such position that the test body 1, when bearing on the pin 32 in a direction along the fillet 4, is fixed in the desired position relatively to the machine. 20 is a girder having a groove in its lower surface for the fillet 5 and a turned-down portion in its upper surface for the shaft 21. This shaft bears on its upper side against a turned-down portion on the lower side of the part 22, which bears on its upper side against the upper pressure-loaded surface of the machine, said surface being the lower surface of the girder 12. The bolts 23 connect the part 22 with the girder 12. 24 are two initially strained tractive helical springs between the part 22 and the girder 20, which are both kept together by means of the springs, without the latter preventing a mutual turning movement between them about the shaft 21.

Fig. 7 shows a section of the part 18 in Fig. 5, which part is taken to be of a circular shape. 25 is a cylinder having a bottom 26 and a partition 27. 28 is a piston slidable through an aperture in the bottom 26 and provided with the piston rod 29, which is slidable in an aperture in the partition 27. Secured to the end portion of the piston rod 29 is a cross piece 30. The helical spring 31 bears on the partition 27 and presses against the piston 28 with a force which, when the cross piece 30 bears against the partition 27, is preferably as large as the maximum pressure due to the own weight of the test body on the piston 28. The length of the helical spring in its unstrained state should be appreciably greater than the length thereof when the cross piece 30 bears on the partition 27, which ensures that the piston 28 may be pressed for a considerable distance into the cylinder 25, without the power of the helical spring being noticeably increased thereby.

In Figs. 8 and 9, 33 designates the upper pressing member of the testing machine. 34 is a vertical plate bearing with its lower edge against the fillet 35. This fillet forms a partially pressure-loaded surface against the cube 1. The plate 34 is rigidly connected with the plate 36, the cylindrically rounded upper edge 37 of which bears on the pressing member 33 of the machine.

It has been found in extensive tests relative to the compression of concrete cubes by the method set forth herein for the compression of test bodies from concrete that proportionality prevails, within ordinary error limits, between the compressive force in the crushing of the cube in the ordinary manner and the compressive force in that cracking of the cube which is obtained when the compressive surfaces are constituted by stripes extending transversely over the surface subjected to pressure, if the stripes have a width between a twentieth and a third of the transverse dimension of the pressed surface at right angles to the stripe, said width being preferably about a seventh of said dimension. In practicing the new method, the nuts 14 are turned in the manner previously explained to gradually increase the pressure that is applied through the long and narrow fillets 4 and 5 to corresponding stripe portions across opposite end surfaces of the test body 1. As the pressure is increased, tensile stresses are set up through the test body along an axis through the fillets 4 and 5 finally resulting in a rupture which appears as a tensile crack in the body along such axis and by which the tensile strength of the body material is ascertained. The cracking of the cubes therefore gives information about the strength of the concrete, which is just as serviceable as that given by the crushing of the cubes. In fact, the knowledge obtained by cracking the test body rather than by crushing it is even more useful since it offers a more direct and accurate means for calculating its shear and bending strengths. This arises from the fact that in my new method, the results obtained by testing a series of concrete bodies of graded strength show a linear relationship as between cracking strength and bending strength as well as between cracking strength and shear strength while the relationship as between the crushing strength and the shear and bending strengths was decidedly non-linear. In cracking, the necessary compressive force will at the same time be about 15% of that required in crushing. The necessary testing machine will thus have small dimensions, is cheap and of small weight and consequently easy to transport.

It has been found that if the narrow compressive surface is formed by a porous wood fibre board, and the two compressed surfaces of the cube are two opposite lateral surfaces, which contacted with the mould in the casting of the cube, approximately the same uniformity will be obtained in the result as in the crushing of the cube in the ordinary manner against surfaces planed off by means of cement. In the cracking of the cube, planing off with cement is thus rendered unnecessary. This makes a working procedure, the cement planing, superfluous, which calls for great dexterity and accuracy on the part of the operator and special care in the subsequent storing of the cube. For this reason cement planing is rather expensive per cube, and it is difficult to have it reliably performed in an ordinary building site. These difficulties disappear with cracking with porous intermediate members without planing with cement.

Thus the cracking of concrete cubes in accordance with the method set forth herein provides for a cheap process for the testing of concrete, which may be substituted for the expensive crushing of the cubes and permits testing of concrete on the building site. This method consequently saves considerable costs of transport.

What I claim is:

1. The method of testing the cracking strength of concrete comprising the step of loading two opposed surfaces of a solid test body of concrete by two equal and opposite compressive forces distributed over aligned straight narrow stripes of uniform width being a part of the loaded surface and extending wholly across said surface.

2. The method of testing concrete which comprises the steps of pressure loading aligned stripe portions across opposite end faces of a test body of concrete adjacent one side thereof, gradually increasing the pressure until a crack appears in the body along the loaded area, moving the loading stripe portions to successive areas across the end faces of the test body each of which is parallel to the preceding loaded area, and gradually increasing the pressure at each of said succeeding loading areas until cracking appears to thereby provide a test of the body in a series of parallel cross-sections from one side to the other.

3. In an apparatus for testing concrete in the form of test bodies, having opposed and substantially parallel end faces to which pressure is to be applied, a lower member for supporting and applying pressure to the lower end face of the test body, an upper member for applying pressure to the upper end face of the test body, said lower and upper members, including vertically aligned grooves in their confronting faces, and fillet bars in said grooves for limiting the applied pressure to corresponding narrow stripe portions across the end faces of the test body, and means for moving one of said members towards the other member.

4. In an apparatus for testing concrete in the form of test bodies having opposed and substantially parallel faces to which pressure is to be applied, a lower member for supporting and applying pressure to one of the parallel faces of the test body, an upper member for applying pressure to the opposite parallel face of the test body, said lower and upper members including vertically aligned fillets for limiting the applied pressure to correspondingly aligned narrow surface portions of said faces, a pair of spring loaded pistons positioned laterally of the fillet associated with said lower member and which together with said fillet form the entire lower support for the test body, and means for moving one of said members toward the other.

5. A testing apparatus as defined in claim 4 wherein said lower member also includes an upstanding pin adjacent one end of the associated fillet to engage a face of the test body and act as a stop therefor.

6. In an apparatus for testing concrete in the form of test bodies having opposed and substantially parallel faces to which pressure is to be applied, a lower member for supporting and applying pressure to one of the parallel faces of the test body, an upper member for applying pressure to the other parallel face of the test body, said lower and upper members including vertically aligned fillets for limiting the applied pressure to correspondingly aligned narrow portions of the parallel faces, said upper member being constituted by a pair of vertically spaced sections including a horizontal bearing shaft therebetween extending at a right angle to the axis of said fillets, and means for moving said upper member towards said lower member.

7. In an apparatus for testing the cracking strength of concrete in the form of test bodies having opposed surfaces to be loaded by pressure, the provisions of compressive means with upper and lower surfaces for applying pressure to a narrow stripe of each surface of the test body, and bearing means between the upper surface of the compressive means and the associated surface of the test body, said bearing means comprising two plates joined together at right angles to one another in the form of a cross one plate bearing with its lower edge against the stripe of the test body surface in the longitudinal direction of said stripe and the other plate bearing with its upper edge against the upper surface of the compressive means.

8. In an apparatus as claimed in claim 7 the further feature that the upper edge of the bearing cross is rounded to bear against the surface of the compressive means substantially along a straight line.

CARL ABRAHAM FORSSELL.

REFERENCES CITED

The following references are of record in the file of this patent:

UNITED STATES PATENTS

| Number | Name | Date |
| --- | --- | --- |
| 493,784 | Reeser | Mar. 21, 1893 |
| 1,147,153 | Emery | July 20, 1915 |
| 1,354,217 | Schneider | Sept. 28, 1920 |
| 1,827,805 | Watts | Oct. 20, 1931 |
| 2,125,116 | Lewis | July 26, 1938 |

OTHER REFERENCES

Batson and Hyde publication, entitled "Mechanical Testing"; vol. 1, pp. 362 and 363. Published by Chapman & Hall, Ltd., London, England. A copy is in Div. 36, U. S. Patent Office.